United States Patent [19]

Morrison

[11] 4,124,228
[45] Nov. 7, 1978

[54] PRESSURE-BALANCED FLUID COUPLING

[75] Inventor: Donald L. Morrison, Yorba Linda, Calif.

[73] Assignee: Kaiser Aerospace & Electronics Corporation, Irvine, Calif.

[21] Appl. No.: 780,598

[22] Filed: Mar. 24, 1977

[51] Int. Cl.² .................. F16L 29/00; F16L 37/22
[52] U.S. Cl. .................. 285/1; 137/614.03; 285/317
[58] Field of Search .............. 137/614, 614.01, 614.02, 137/614.03, 614.04; 285/315, 316, 317, 320, 1; 251/149, 149.6

[56] References Cited

U.S. PATENT DOCUMENTS

| | | | |
|---|---|---|---|
| 2,634,927 | 4/1953 | Smith et al. | 251/149.6 |
| 2,946,605 | 7/1960 | Mosher | 137/614.03 |
| 3,097,867 | 7/1963 | Saloum | 137/614.03 |
| 3,279,827 | 10/1966 | Brown | 285/1 |
| 3,613,726 | 10/1971 | Torres | 285/316 X |
| 4,007,909 | 2/1977 | Buseth et al. | 285/316 X |

*Primary Examiner*—Martin P. Schwadron
*Assistant Examiner*—A. Michael Chambers

*Attorney, Agent, or Firm*—Fulwider, Patton, Rieber, Lee & Utecht

[57] ABSTRACT

A fluid coupling of the type which couples automatically on the engagement of two coupling members and which uncouples automatically on the application of a predetermined minimum axial separation force, as is useful in refueling operations between moving vehicles. One coupling member has an annular groove about its outer surface, and the other carries at least one locking ball which may be held in engagement with the groove by a lock ring having graduations in internal diameter. Applying a tensile force between the coupling members compresses a spring and simultaneously displaces the lock ring with respect to the ball until an unlocked position is reached, allowing uncoupling by release of the ball from the groove. Uncoupling may also be effected manually and independently of the tensile force applied, and there is a convenient adjustment of the threshold force necessary for uncoupling. The coupling preferably includes automatically operable valves to prevent loss of fluid on uncoupling, and is almost completely pressure balanced, to provide for consistent and reliable operation and very little change in operating characteristics over a wide range of fluid pressures.

3 Claims, 4 Drawing Figures

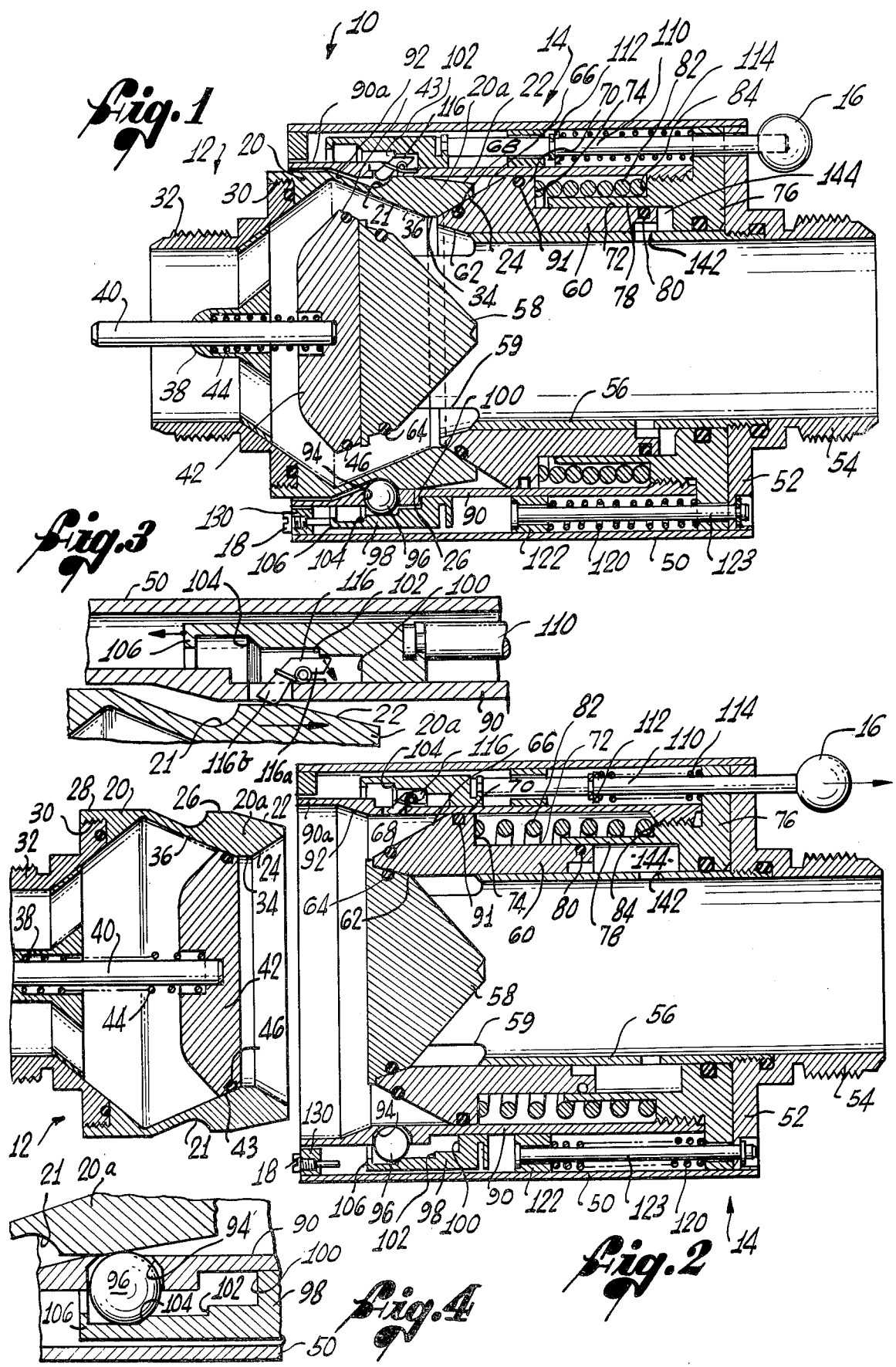

PRESSURE-BALANCED FLUID COUPLING

BACKGROUND OF THE INVENTION

The present invention relates generally to couplings for connecting two pipeline sections for conveying fluid therethrough, as in the refueling of one moving vehicle from another. More particularly, the invention relates to couplings of this general type having coupling elements which latch together automatically when brought into engagement, and which release automatically when subjected to a predetermined minimum tensile force.

Although fluid couplings of this type can be used in almost any application requiring the transportation of fluids, they are ideally suited for use in refueling operations, which require the pumping of fluid fuel from one moving vehicle to another, such as from one aircraft to another or from a ship to an aircraft. In such refueling operations, it is desirable that the coupling should automatically disconnect when subjected to a predetermined minimum tensile force. This feature not only provides a convenient means for terminating a refueling operation, but also avoids damage to the fluid-conveying lines and consequent loss of fuel on inadvertent separation of the vehicles. It is also preferable that couplings of this type include a "dry-break" feature, whereby each member of the coupling is automatically sealed on disconnection, to eliminate or minimize any loss of fuel.

Although a number of couplings having these general characteristics are to be found in the prior art, and although some of these may be generally satisfactory in some respects, none of them includes means for conveniently adjusting the minimum uncoupling force over wide limits. Ideally, couplings of this type should also be manually disconnectable and should, as far as possible, be pressure balanced, i.e., the minimum tensile force necessary to disconnect the coupling should be substantially independent of the fluid pressure inside the coupling. In addition, any self-sealing valves used to implement the dry-break feature should operate independently of the pressure balancing and tension break-away features so that the dry-break feature may be optionally dispensed with, without detracting from the other performance features of the coupling. The present invention satisfies all of these needs and requirements.

SUMMARY OF THE INVENTION

The present invention resides in a fluid coupling of the foregoing type, including means integral with the coupling for manually disconnecting it, and means for adjusting the minimum uncoupling force over wide limits without the need for disassembly of the coupling. Basically, and in general terms, the fluid coupling of the invention includes first and second coupling members connectible to respective pipeline sections to be coupled together, sleeve means slidably mounted in one of the coupling members, resilient means to urge the sleeve means into sealing engagement with the other of the coupling members and for maintaining such engagement during substantial relative axial movement of the two coupling members, and latching means which automatically engage as the first and second coupling members are placed together, to inhibit their separation.

More importantly, the invention includes second resilient means located to resist axial separation of the first and second coupling means by a force which increases with their relative displacement, and means acting in cooperation with the latching means, for releasing the latching means when a predetermined separation displacement, corresponding to a predetermined minimum separation force, has been reached. As already mentioned, it is preferable that the entire coupling be pressure balanced to ensure that the predetermined minimum separation force is not significantly affected by changes in fluid pressure in the coupling. Also included are means for adjusting the predetermined separation displacement and minimum separation force, and manual means for releasing the latching means without first relatively displacing the first and second coupling means.

Preferably, to prevent loss of fluid in coupling or uncoupling the pipeline sections, each of the first and second coupling members includes spring-biased valve means which open automatically on coupling of the two members and close automatically on uncoupling.

More specifically, in accordance with a presently preferred embodiment of the invention, the first coupling member is of generally cylindrical shape and has an annular groove around its outer wall. The second coupling member includes a nipple means connectible to one of the pipeline sections, and a generally cylindrical barrel sized to receive the first coupling member freely therein, the barrel being slidably movable with respect to the nipple means, and having at least one radial hole through its wall. The latching means of this embodiment includes at least one locking ball carried in the radial barrel hole and sized to protrude substantially but not completely through the hole toward the inside of the barrel. A lock ring having graduated steps of internal diameter is disposed over the barrel, and is movable between a locked position in which the lock ring retains the ball in engagement with the annular groove in the first coupling member, and an unlocked position in which the ball is free to move out from the groove to release the first coupling member.

In the illustrative embodiment, there is also included a lock ring trip means for latching the lock ring in its unlocked position. The lock ring trip means is releaseable by means integral with the first coupling member, as the two-coupling members are engaged.

The second resilient means, for resisting separation of the first and second coupling members, is located to resist axial separation of the nipple means and the barrel. On axial separation of the first and second coupling members, the barrel, locking ball, and sleeve means move with the first coupling member with respect to the nipple means of the second coupling member, and this displacement is resisted by an ever increasing force applied by the second resilient means. The lock ring, on the other hand, moves with the second coupling member, and eventually reaches a position in which a portion of increased internal diameter is aligned with the ball, thereby releasing the coupling as the ball disengages the annular groove on the first coupling member.

The means for adjusting the predetermined separation displacement or separation force includes screw adjustment means operable to vary the position of the lock ring with respect to the second coupling member, thereby varying the amount of displacement necessary before release of the coupling. The manual means for release of the latching means includes means rigidly connected to the lock ring, for manually displacing it without movement of the second coupling member, thereby manually releasing the coupling.

In the preferred embodiment, the sleeve means is slidably movable with respect to the nipple means, and also functions to seal the second coupling member on uncoupling of the two members, and to open the fluid coupling for flow therethrough on coupling of the members.

In accordance with another important aspect of the invention, the fluid pressure forces acting in opposite axial directions on the sleeve means balance each other, so that there can be no pressure-dependent forces acting to unseat the sleeve from sealing engagement with the first coupling member, and any pressure-dependent forces acting to separate the first and second coupling members will be kept to a minimum.

It will be appreciated from the foregoing that the present invention represents a significant advance in the field of fluid couplings of the type which couples automatically on the engagement of the two coupling members, and uncouples automatically when a predetermined minimum axial separation force is applied between the members. In particular, the provision of a predetermined minimum separation force which is independent of fluid pressure and is readily adjustable without disassembly of the coupling members, and the further provision of manual means for releasing the coupling, are features which result in a convenient and reliable device with advantages not to be found in others of this general type. Other aspects and advantages of the present invention will become apparent from the following more detailed description, taken in conjunction with the accompanying drawings.

BRIEF DESCRIPTION OF THE DRAWINGS

FIG. 1 is a longitudinal sectional view of the coupling of the invention, shown in a coupled position;

FIG. 2 is a view similar to FIG. 1, but with the coupling shown in an uncoupled position; and FIG. 3 is an enlarged, fragmentary sectional view of a portion of the coupling, illustrating operation of the lock ring trip mechanism during a coupling operation; and FIG. 4 is an enlarged, fragmentary sectional view of another portion of the coupling, illustrating the action of the locking ball and lock ring during a coupling operation.

DETAILED DESCRIPTION

As shown in the drawings for purposes of illustration, the present invention is embodied in a fluid coupling, indicated by reference numeral 10, having a first coupling member 12, which will be referred to herein as the male member, and a second coupling member 14, which will be referred to herein as the female member. As will be described in detail, when the male member 12 is moved into engagement with the female member 14, the two are automatically latched together, and fluid communication is established between them. Uncoupling is effected either by operation of a manual release knob 16, or by application of a predetermined minimum axial separation force between the two coupling members.

The principal aspects of the invention are the provision of the manual release 16 integral with the coupling 10, and the provision of an adjusting screw 18 on the female coupling member 14, to adjust the minimum separation force necessary to uncouple the male and female members. There is also a pressure balancing feature, to be described, which ensures that the desired minimum separation force is substantially independent of internal fluid pressure.

As best shown in FIG. 2, the male coupling member 12 includes a generally cylindrical body 20 having an annular groove 21 about its exterior, and a leading end portion 20a bounded by an outer conical surface 22 which tapers to a rendered diameter at the leading end of the body, and an oppositely tapered inner conical surface 24, i.e., the leading end portion 20a tapers to a minimum cross-section at its very end. Adjoining the outer conical surface 22 is relatively short-length cylindrical surface 26 which is bounded on one side by the conical surface 22 and on the other side by the groove 21. On rearward side of the groove 21 is another cylindrical surface 28 which is of slightly larger diameter than the cylindrical surface 26. At the rearward end of the body 20 is a threaded cylindrical recess 30 for attachment to a pipeline connector 32. Adjoining the inside conical surface 24 is a relatively short-length cylindrical surface 34, and adjoining it is another conical surface 36 tapered oppositely to the conical surface 24, i.e., reducing in diameter towards the leading end of the end portion 20a.

Rigidly connected with the connector 32 is a central support 38 comprising an axially aligned sleeve in which a guide rod 40 is slidably engaged. The guide rod 40 supports at its end a poppet 42 having at its outer periphery a conical surface 43 sized to engage the internal conical surface 36 when urged forwardly by a compression spring 44 disposed between the poppet and the central support 38. A seal 46, partly recessed in the surface 43, ensures sealing contact between the poppet 42 and the conical surface 36, to prevent leakage of fluid from the male coupling member 12 when it is not coupled to the female member 14.

The female coupling member 14 is also generally cylindrical in shape, including an outer cylindrical shroud 50 and a rear annular end plate 52 having a cylindrical nipple 54 formed integrally therewith, the nipple being threaded for attachment to a pipeline section. Rigidly attached to the end plate 52 is an inner cylinder 56 of approximately the same internal diameter as the nipple 54. The inner cylinder 56 is, at its end remote from the nipple 54, rigidly attached to a poppet 58 of generally conical shape, presenting a flat surface toward the male coupling member 12 and a conical surface in the opposite direction. The inner cylinder 56 is connected to the conical poppet 58 by an open web structure, indicated at 54, which permits flow of fluid around the poppet 58 to or from the interior of the cylinder 56.

The maximum diameter of the conical poppet 58 is slightly larger than the outside diameter of the inner cylinder 56, and, slidably mounted over the cylinder is a sleeve 60 having, at its end nearest the poppet 58, an internal conical surface 62 for sealingly engaging the conical poppet 58, which carries an appropriate recessed seal 64. The slide 60 also has an external conical surface 66 which carries another partly recessed seal 68, for engaging the internal conical surface 24 of the male coupling member 12. The slide 60, therefore, includes a leading tapered portion defined in part by the conical surfaces 62 and 66, and further includes an outer cylindrical surface 70, of relatively short length, adjoining the outer conical surface 66, and an outer cylindrical surface 72 of longer length and of smaller diameter than the surface 70, there being an annular shoulder 74 between the two cylindrical surfaces.

Also mounted for sliding movement on the outer surface of the inner cylinder 56 is an annular plate 76 which is normally positioned adjacent the end wall 52. This plate 76 has an integral cylindrical collar 78 which projects over and slidingly engages the smaller-diameter cylindrical surface 72 of the slide 60, forming a sealing contact therewith in cooperation with another seal 80. A compression spring 82 is disposed between the shoulder 74 and another shoulder 84 on the annular plate 76, thereby urging the slide 60 into sealing engagement with the cylindrical poppet 58 when the coupling 10 is uncoupled, as shown in FIG. 2.

A cylindrical barrel 90 is rigidly attached, as by screw threads, to the annular plate 76 and is of such a diameter as to sealingly engage the slide 60 about its outer, larger-diameter, cylindrical surface 70, there being yet another seal 91 partially recessed in the surface 70. The barrel 90 is substantially coextensive with the shroud 50, and has a leading portion 90a of slightly enlarged diameter, at the end closer to the male coupling member 12, there being an internal conical surface 92 between the enlarged diameter portion 90a and the remainder of the barrel 90. Adjacent the conical surface 92, but not on the enlarged diameter portion 90a, is at least one tapered hole 94 to accommodate a locking ball 96 which is of such a size as to protrude substantially, but not completely, through the hole from the outside. Although only one ball 96 is illustrated, it will be understood that a plurality of such balls, carried at angularly spaced holes in the barrel 90, may be utilized to latch the coupling securely together.

Slidably engaged on the outer surface of the barrel 90 is a lock ring 98 which retains the ball 96 in the hole 94. The lock ring 98 has four graduated steps of differing internal diameter. At its end furthest from the male coupling member 12, the lock ring 98 has its region of smallest internal diameter, which slidably engages the outer surface of the barrel 90. An annular shoulder 100 defines an abrupt increase in internal diameter from this minimum-diameter region, and another annular shoulder 102 defines yet another increase in diameter. There is a further, more gradual increase in diameter defined by a sloping annular shoulder 104. The lock ring 98 terminates in an annular lip 106 which helps to retain the ball 96 in the annular recess formed between the lip and the shoulder 104. When the lock ring 98 is holding the ball 96 in a locked position, the ball rests on the ledge between the sloping shoulder 104 and the shoulder 102, and protrudes through the hole 94 to engage the annular groove 21 in the male coupling member 12, as shown in FIG. 1. When the lock ring is in an unlocked position, the ball 96 is free to move radially outwardly into the recess between the lip 106 and sloping shoulder 104, thereby releasing the male coupling member 12.

Rigidly attached to the lock ring 98 at one point in its circumference is a rod 110 which is disposed between the barrel 90 and the shroud 50, and which extends through corresponding aligned holes in the annular plate 76 and the end plate 52. The manual release knob 16 is attached to the end of the rod 110. There is a flange 112 formed at a point intermediate the ends of the rod, and a light compression spring 114 is disposed between the flange and the annular end plate 76. This spring 114, therefore, is operative to urge the lock ring 98 to the left, as viewed in the drawings, with respect to the barrel 90. It will be seen that urging the lock ring 98 in this direction has the effect or urging the ball 96 inwardly into engagement with the groove 21.

As best shown in FIG. 3, there is mounted on the barrel 90, at an axial distance from its end corresponding approximately to the position of the bail 96, a lock ring trip mechanism 116. The lock ring trip 116 is a generally V-shaped latch, pivotally mounted at the outer surface of the barrel 90, having an upper arm 116a (FIG. 3) projecting upwardly and rearwardly toward the lowest diameter end of the lock ring 98, and a lower arm 116b projecting downwardly through an opening in the barrel 90. As will be seen, the remote end of the upper portion 116a of the lock ring trip mechanism is engageable with the annular shoulder 102 of the lock ring 98, to hold the lock ring in an unlocked position, as shown in FIG. 2. The lock ring trip mechanism 116 is spring-biased in a counterclockwise direction, as viewed in the drawings, and will thus engage the annular shoulder 102 if the lock ring 98 is moved to the right with respect to the barrel 90, so long as the lock ring trip mechanism is not cammed in a clockwise direction from inside the barrel 90.

A most important element of the female coupling member 14 is another compression spring 120 which is disposed between the annular plate 76 and a flange-like spring retainer 122 affixed to the end of a connecting rod 123 which is, in turn, rigidly attached to the end plate 52. The connecting rod 123 is disposed inside the spring 120 and between the shroud 50 and the barrel 90. This spring 120 is the one which determines the minimum axial separating force of the coupling 10, as will shortly be described. It will again be appreciated that there may be more than one such spring 120, angularly spaced about the female coupling member 14.

The coupling 10 is shown in its uncoupled configuration in FIG. 2. In this position, the poppet 42 is sealed against the inner cylindrical surface 36 and the slide 60 is sealed against the conical poppet 58, thereby preventing any flow of fluid to or from either half of the coupling. As mentioned earlier, the lock ring trip mechanism 116 is engaged against the annular shoulder 102 of the lock ring 98, thereby allowing the ball 96 to move as far as possible in an outward radial direction. The light compression spring 114 maintains pressure between the annular shoulder 102 and the lock ring trip mechanism 116, to maintain the lock ring 98 in its unlocked position.

When the coupling members 12 and 14 are to be coupled together, the male member 12 is brought into contact with the slide 60, and moves it back against the force of the compression spring 82. Simultaneously, the conical poppet 58 comes into contact with the poppet 42, and the latter is moved back against the force of its compression spring 44, thereby simultaneously opening both halves of the valve 10 and forming a fluid communication path therebetween.

As the leading end portion 20a of the cylindrical body 20 is inserted into the female coupling member 14, it forces the ball 96 outwardly against the lock ring 98. The ball 96, when resting in an unlocked position, still protrudes a few thousandths of an inch through the hole 94, so that the conical surface 22 on the leading end portion 20a of the body 20 will engage the ball, as best shown in FIG. 4. Because of the presence of the sloping shoulder 104, an axial force is transmitted from the male coupling member 12 to the lock ring 98, through the ball 96, and the lock ring is thereby moved axially against the force of the spring 114, relieving the pressure between the lock ring trip mechanism 116 and the annular shoulder 102. As the leading end portion 20a is moved further inwardly with respect to the female coupling member 14, the lock ring trip mechanism is cammed in a clockwise direction, as shown in FIG. 3, by the leading surfaces 22 and 26 of the end portion 20a, and the locking ring 98 is then urged to the left by the force of the spring 114. As the male coupling member 12 is moved further into engagement with the female member 14, the ball 96 is eventually aligned with the annular groove 21, and locking takes place, with the coupling then being in the position shown in FIG. 1.

The coupling will remain in this coupled configuration until either manually released by operation of the knob 16, or until application of a sufficient axial separation force between the two halves of the coupling. First, with regard to the manual uncoupling procedure, it will be apparent that movement of the knob 16 in an outward or rightward direction will allow the ball 96 to be moved into the recess between the shoulder 104 and the lip 106 of the lock ring 98, thereby allowing the ball to become disengaged from the annular groove 21 and allowing the coupling members to separate.

For an understanding of uncoupling by application of a minimum tensile force, an additional structural element must first be described. Rigidly attached to the shroud 50 at its end opposite the end plate 52 is an annular plate 130 having, at one point in its circumference, the adjusting screw 18 threadably engaged through it, the screw extending to abut the annular lip 106 of the lock ring 98. In the coupled position shown in FIG. 1, the lock ring 98 is urged to the left by the compression spring 114. It will be apparent that the position of the adjusting screw 18 will determine how far the lock ring 98 must be moved in an uncoupling step before the ball 96 will be disengaged from the annular groove 21 to release the coupling.

When a tensile force is applied between the nipple 54 and the pipeline connector 32, the force is transmitted through the end plate 52, the rod 123, the compression spring 120, the annular plate 76, the barrel 90, and the ball 96. Accordingly, the barrel 90 and the slide 60 will move with the male coupling member 12. The lock ring 98, however, will move with the nipple 54 by forces transmitted through the end plate 52, the shroud 50, and the adjusting screw 18. When the lock ring 98 has been displaced sufficiently with respect to the ball 96, the ball will be released from the annular groove 21 in the male coupling 12, resulting in immediate uncoupling. The greater the displacement that is required, the greater will be the uncoupling force necessary, as determined by the characteristics of the compression spring 120. The degree of displacement, and the uncoupling force, can be adjusted by movement of the adjusting screw 18, thereby initially displacing the lock ring 98 with respect to the ball 96.

The range of minimum uncoupling forces selectable by adjusting the screw 18 will, of course, depend on more specific aspects of the coupling design. However, by way of example only, a coupling constructed in accordance with the invention and designed to carry approximately 600 gallons per minute at 70 pounds per square inch pressure, can have its minimum uncoupling tension adjusted over a range of zero to 1,000 pounds.

It will be appreciated by those familiar with fluid-carrying pipelines that various factors external to the coupling itself can substantially affect the uncoupling forces. For example, if a pipeline incorporating the coupling is not supported along its entire length the weight of that portion of the pipeline below the coupling will contribute to the uncoupling force. Similarly, any downstream valve or other device which is not pressure-balanced will also result in the application of a tensile force to the coupling. Naturally, the present invention makes no allowance for these externally generated forces, and is concerned only with the net uncoupling force applied to the coupling.

Regardless of whether the lock ring 98 is displaced by operation of the manual release knob 16 or by application of a separation force between the coupling members 12 and 14, the lock ring trip mechanism 116 will engage the shoulder 102 of the lock ring as the ball 96 is released from the groove 21. Thus, the lock ring trip mechanism 116 operates to latch the lock ring 98 in an unlocked position until the next coupling operation is performed.

It will be apparent that the slide 60 will be subjected to axial forces as a result of fluid pressure in the coupling 10. Forces acting on the leading end of the slide 60, i.e., between the seal 68 and the inner cylinder 56, will tend to further compress the spring 82 and to break the fluid seal at 68. However, in the present invention, there is an opening 142 through the inner cylinder 56, so that fluid pressure in the coupling is also applied to the slide in the opposite direction, through an annular chamber 144 defined by the cylinder 56 and the collar 78 on the annular plate 76. The slide 60 is so dimensioned that the effective areas of its end portions thereby exposed to fluid pressure are approximately equal. consequently, the coupling and uncoupling operations are substantially independent of fluid pressure. There is only a very small unbalanced pressure force, acting on the end area of the cylinder 56, but the coupling is otherwise fully pressure-balanced.

It will be appreciated from the foregoing that the present invention represents a significant advance in the field of fluid coupling devices. In particular, the provision of a readily adjustable tension break-away force, and the provision of a manual release control integral with the coupling, combined with automatically operated valves to prevent fluid loss, all result in an extremely reliable and efficient fluid coupling. It will also be appreciated that, although a particular embodiment of the invention has been described in detail for purposes of illustration, various changes and modifications may be made without departing from the spirit and scope of the invention. Accordingly, the invention is not to be limited except as by the appended claims.

I claim:

1. A fluid coupling for connecting two fluid pipeline sections, comprising:
   a first coupling member of generally cylindrical shape connectible to one section of pipeline, having an exterior annular groove thereon;
   a second coupling member including
      nipple means connectible to the other section of pipeline,
      an inner cylinder rigidly connected to said nipple means,
      a generally cylindrical barrel sized to receive said first coupling member therein and slidably mounted with respect to said inner cylinder and said nipple means, said barrel having at least one opening through its wall, at least one latching element carried in said barrel opening, a lock ring of graduated internal diameter disposed over said barrel and movable with respect to said barrel between a locked position in which said latching element is urged inwardly by said lock ring into engagement with said annular groove, and an unlocked position in which said latching element is free to move outwardly from said groove, sleeve means slidably mounted over said inner cylinder, first resilient means for urging said sleeve means into sealing contact with said first coupling member, and second resilient means located to resist axial separation of said nipple means and said barrel; and manually operable means for moving said lock ring to said unlocked position without application of a separation force;

whereby said first and second coupling members may be uncoupled by applying a tensile force between said first coupling member and said nipple means, said barrel being thereby displaced with said first coupling member until said unlocked position of said lock ring is reached.

2. A fluid coupling for connecting two fluid pipeline sections, comprising:

a first coupling member of generally cylindrical shape connectible to one section of pipeline, having an exterior annular groove thereon;

a second coupling member including nipple means connectible to the other section of pipeline, an inner cylinder rigidly connected to said nipple means, a generally cylindrical barrel sized to receive said first coupling member therein and slidably mounted with respect to said inner cylinder and said nipple means, said barrel having at least one opening through its wall, at least one latching element carried in said barrel opening, a lock ring of graduated internal diameter disposed over said barrel and movable with respect to said barrel between a locked position in which said latching element is urged inwardly by said lock ring into engagement with said annular groove, and an unlocked position in which said latching element is free to move outwardly from said groove, sleeve means slidably mounted over said inner cylinder, first resilient means for urging said sleeve means into sealing contact with said first coupling member, second resilient means located to resist axial separation of said nipple means and said barrel, and lock ring trip means affixed to said barrel and operable to latch said lock ring in said unlocked position with respect to said barrel, and also operable to release said lock ring from said unlocked position automatically on engagement of said first coupling member with said second coupling member; and means integral with said first coupling member, for cooperating with said lock ring trip means to release said lock ring from said unlocked position;

whereby said first and second coupling members may be uncoupled by applying a tensile force between said first coupling member and said nipple means, said barrel being thereby displaced with said first coupling member until said unlocked position of said lock ring is reached.

3. A fluid coupling as set forth in claim 2, wherein:

said lock ring includes an internal annular shoulder for cooperating with said spring-biased latch, and a sloping annular shoulder forming an internal diameter change;

said lock ring trip means includes a spring-biased latch pivotally mounted on said barrel, whereby said latch automatically engages said internal annular shoulder when said lock ring is moved to said unlocked position;

said second coupling member further includes third resilient means urging said lock ring toward said locked position with respect to said barrel, and thereby urging said annular shoulder against said latch to hold said lock ring in said unlocked position;

said latch includes a camming portion extendable through an opening in said barrel; and said means integral with said first coupling member, for cooperating with said lock ring trip means, includes an external tapered surface on said first coupling member cooperating with said camming portion;

whereby, as said first coupling member is moved into engagement with said second coupling member, said tapered surface engages said ball, which in turn engages said sloping shoulder and moves said lock ring with respect to said barrel, allowing said latch to be disengaged from said internal shoulder by cooperation of said tapered surface and said camming portion.

* * * * *